United States Patent [19]

Olshansky

[11] 4,105,284

[45] Aug. 8, 1978

[54] BUFFERED OPTICAL WAVEGUIDE FIBER

[75] Inventor: Robert Olshansky, Addison, N.Y.

[73] Assignee: Corning Glass Works, Corning, N.Y.

[21] Appl. No.: 684,650

[22] Filed: May 10, 1976

[51] Int. Cl.² ............................................. G02B 5/14
[52] U.S. Cl. ................................................ 350/96.33
[58] Field of Search ........................ 350/96 WG, 96 B

[56] References Cited
U.S. PATENT DOCUMENTS 4,000,936  1/1977  Gloge ........................... 350/96 WG

OTHER PUBLICATIONS

Gloge, Article in *Bell System Technical Journal*, Feb. 1975, pp. 245–262.

*Primary Examiner*—John K. Corbin
*Assistant Examiner*—Stewart Levy
*Attorney, Agent, or Firm*—William J. Simmons, Jr.; Walter S. Zebrowski; Clarence R. Patty, Jr.

[57] ABSTRACT

A low loss buffered optical waveguide fiber is described. An optical waveguide fiber is coated with a first layer of high modulus material applied to the exterior longitudinal surface thereof. Thereafter, a second layer of low modulus plastic material is disposed over the layer of high modulus material. The ratio $R_i/R_o$ of the radii of the first and second applied layers is selected to minimize the microbending loss.

4 Claims, 2 Drawing Figures

BUFFERED OPTICAL WAVEGUIDE FIBER

BACKGROUND OF THE INVENTION

The present invention relates to low loss buffered glass optical waveguide fibers.

Recent advances in the fabrication of optical fibers from ultratransparent materials have caused such fibers to be a promising transmission medium for optical communication systems. To be acceptable for use in optical communication systems, these light transmitting fibers, which are referred to as optical waveguides, should exhibit low signal attenuation, preferably below 10dB/kilometer. In the transmission of such light signals, which may consist of visible or invisible light, such signals are readily attenuated in response to relatively small distortions of the optical waveguide. For example, relatively sharp bends, or a rough adjacent surface may produce sufficient distortions within the optical waveguide to result in totally unacceptable signal attenuation. Similarily, transverse or longitudinal stresses imposed upon the optical waveguide fibers during cable construction or inherent in the resulting structure may produce totally unacceptable signal attenuation in the resulting cable. The loss of signal due to microbending of optical fibers caused by the irregularities at the interface between the fiber and its surrounding has been somewhat alleviated by the application of a plastic jacket to the fiber immediately after the fiber is drawn. U.S. patent application Ser. No. 692,895 filed in the name of S. A. Claypoole et al. on June 4, 1976 and assigned to a common assignee, which application is a continuation-in-part of application Ser. No. 593,286 filed July 7, 1975, now abandoned, teaches the application of a release agent to the optical waveguide fiber followed by the application of a thermoplastic coating for the purpose of increasing fiber strength and decreasing signal attenuation due to forming a plurality of such buffered fibers into an optical waveguide fiber cable.

The publication by D. Gloge entitled "Optical-Fiber Packaging and Its Influence on Fiber Straightness and Loss" Bell System Technical Journal, Vol. 54, No. 2, Feb. 1975, pp. 245-262 discusses the reduction in fiber attenuation resulting from the application of various types of plastic coatings to the fiber. Gloge discusses the relative protection afforded by a soft plastic jacket, a hard plastic jacket, a hard plastic jacket padded with a thin layer of soft plastic material or a shell of hard plastic material on top of soft plastic material. In his theoretical analysis of the protection afforded by multiple layer jackets, Gloge makes the assumption that if the outer jacket is the softer one and sufficiently thick that a deformation beyond its elastic limit is unlikely, the elastic modulus of the jacket is simply the modulus of the outer jacket material. This assumption is not justified and can result in an erroneous determination of the effects of such a double layer jacket.

SUMMARY OF THE INVENTION

It is an object of the present invention to provide an optical waveguide fiber haing a protective jacket of such a construction that microbending losses are minimized.

Briefly, according to the present invention, an optical waveguide fiber is provided with a two material buffer coating which provides maximum reduction of microbending loss in the fiber. An optical waveguide fiber having a radius $R_f$ is formed of a material having a Young's modulus $E_f$. A first layer of plastic material having a Young's modulus $E_i$ is disposed on the external surface of the fiber, $E_f$ being at least 10 times greater than $E_i$. A second layer of plastic material having a Young's modulus $E_o$ is disposed on the surface of the first layer, $E_i$ being at least 10 times greater than $E_o$. The ratio o the radius $R_i$ of the first layer to the radius $R_o$ of the second layer is determined by the equation $$R_i/R_o \approx 0.817 - K/18 - 27/32(E_f R_f^4/E_i R_o^4)$$

where K is given by the equation $K = (1-2\nu)$ and $\nu$ is the average Poisson's ratio for the plastic materials.

Additional objects, features and advantages of the present invention will become apparent to those skilled in the art from the following detailed description and the attached drawing on which, by way of example, only the preferred embodiment of this invention is illustrated.

DETAILED DESCRIPTION

Figure 1:
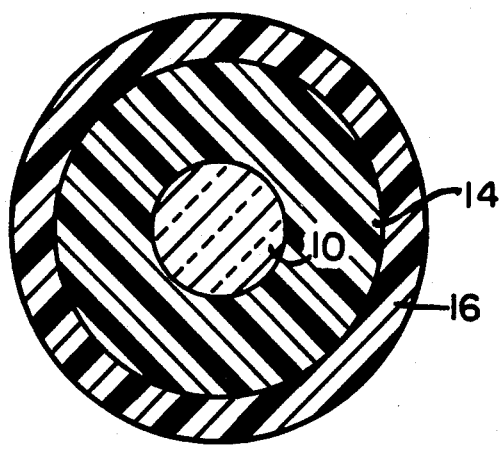
FIG. 1 is a cross-sectional view of the buffered optical waveguide fiber of the present invention.

Referring to FIG. 1, there is shown a typical optical waveguide fiber 10 which may be made from such materials as glass or plastic. Operational theories and other pertinent information concerning optical waveguides may be found in U.S. Pat. No. 3,157,726 issued to Hicks et al.; the publication entitled "Cylindrical Dielectric Waveguide Mode" by E. Snitzer, Journal of the Optical Society of America, Volume 51, No. 5, pages 491-498, May 1961; and in "Fiber Optics Principles and Applications" by N. S. Kapany, Academic Press, 1967.

A first protective layer 14 of high modulus plastic material such as flurocarbon, nylon, thermoplastic polyethylene, polycarbonate or the like is disposed on the surface of fiber 10. The fiber may be provided with a thin coating of a release agent in accordance with the teachings of the aforementioned patent application Ser. No. 692,895, but such release agent is not necessary for the practice of the present invention. A second protective coating 16 of low modulus plastic material such as polyurethane elastomer, ethylene vinyl acetate, polyvinyl chloride, thermoplastic rubber (TPR) or the like is disposed on the surface of layer 14. Table I lists the Young's modulus and method of application of each of the aforementioned materials that can be employed for the first and second protective layers.

TABLE I

| Material | Modulus (psi) | Application Method* |
|---|---|---|
| Flurocarbon | $6-9 \times 10^4$ | E, S, PC |
| Nylon | $1.5-3 \times 10^5$ | E, PC |
| Thermoplastic Polyethylene | $2.8 \times 10^5$ | E |
| Polycarbonate | $3-3.5 \times 10^5$ | E, S |
| Polyurethane Elastomer | $5 \times 10^2$ | E, S, PC |
| Ethylene Vinyl Acetate | $3.5-4.5 \times 10^3$ | E, S |
| Polyvinyl Chloride | $2.7 \times 10^3$ | E |
| Thermoplastic Rubber | $5-18 \times 10^2$ | E |

*E = Extrusion
S = Solution
PC = Electrostatic Powder Coating

Coatings with high elastic modulus decrease the microbending by increasing the flexural rigidity or stiffness of the coated fiber. Low modulus coatings reduce the microbending of a coated fiber by deforming to the surface irregularities and thus reduce the effective stress on the fiber. Increasing the thickness of a high modulus coating increases the flexural rigidity by an amount which goes as the fourth power of the coating's outer radius. Increasing the thickness of a low modulus coating, however, does not give significant additional protection, provided that the coating is sufficiently thick to be able to deform elastically to most of the stress producing irregularities. Thus, if the total coating thickness exceeds this minimal amount, a superior buffer coating can be obtained by surrounding a relatively thick layer of high modulus material with an outer layer of low modulus material.

The theory of elastic materials can be used to determine the thickness of the layers of high and low modulus materials which minimize the fiber microbending loss. Microbending losses are proportional to the power spectrum of the fiber's curvature. As indicated in the aforementioned Gloge publication, this power spectrum is in turn proportional to the factor $(D/H)^2$ where D is the lateral compressibility and H is the flexural rigidity of the buffered fiber. The flexural rigidity can easily be derived from an expression given by L. D. Landau et al., *Theory of Elasticity*, Addison-Wesley (1975) p. 75 and is found to be $$H = (\pi/4)[E_s R_f^4 + E_i(R_i^4 - R_f^4) + E_o(R_o^4 - R_i^4)] \quad (1)$$

where $E_s$, $E_i$ and $E_o$ are respectively the elastic modulii for the waveguide fiber material, the inner buffering material and the outer buffering material. $R_f$ is the fiber's radius, and $R_i$ and $R_o$ are, respectively, the outer radii of the inner and outer coatings.

Whereas the aforementioned Gloge publication sets forth a theory concerning the reduction of bending losses which is based upon the assumption that the elastic modulus of the composite jacket is simply the modulus of the outer jacket, the present invention takes into account the exact cylindrical geometry of the fiber and the double layer coating. The lateral compressibility can be approximately determined from the results set forth by A. J. Lur'e at page 387 of *Three-Dimensional Problems of the Theory of Elasticity*, John Wiley & Sons, Inc. (1964). Lur'e provides exact solutions for a cylinder of outer radius $r_o$ and inner radius $r_i$, which cylinder is under uniform normal pressures $p_o$ and $p_i$. By matching boundary conditions for two such solutions, one for an inner cylinder with $r_o$ equal to $R_i$ and $r_i$ equal to 0, and the other for an outer cylinder with $r_o$ equal to $R_o$ and $r_i$ equal to $R_i$, the exact solution for the lateral compressibility of a two material buffer coating under uniform normal pressure can be obtained. With x defined as $R_i/R_o$, it can be determined that $$D = \frac{E_o}{(1+\nu)(1-2\nu)} \frac{E_i(1 + Kx^2) + E_o K(1 - x^2)}{E_i(1 - x^2) + E_o(K + x^2)} \quad (2)$$

where $$K = (1-2\nu) \quad (3)$$

and $\nu$ is the average Poisson's ratio for the two materials. The value of $\nu$ is equal to about 0.45 for thermoplastic material.

The aforementioned loss reduction factor is a function of the variable x.

For given materials and specified values of the fiber radius, the maximum value of the factor $(H/D)^2$ can be determined by setting its derivative equal to zero. By setting $d/dx \, (H/D)^2$ equal to zero, the following expression is obtained.

$$(1/H)(dH/dx) - (1/D)(dD/dx) = 0 \quad (4)$$

Equation (4) can be simplified by using the facts that $E_f$ is much greater than $E_i$, $E_i$ is much greater than $E_o$, K is much less than 1 and $(E_i R_i^4/E_i R_i^4)$ is much less than 1. The phrases "much greater than" and "much less than" mean that the compared quantities differ by at least a factor of about ten. Thus, the following approximate result can be obtained.

$$R_i/R_o \approx 0.817 - K/18 - 27/32(E_i R_f^4/E_i R_o^4) \quad (5)$$

A typical example of the present invention is as follows. An optical waveguide fiber is produced in accordance with the methods taught in U.S. Pat. No. 3,823,995 issued to L. L. Carpenter. The waveguide cladding consists of pure fused silica whereas the core consists of fused silica which is doped with an oxide which increases the refractive index thereof. The Young's modulus of such fiber is about $9 \times 10^6$ psi. The first layer 14 is to consist of nylon which has a Young's modulus of $3 \times 10^5$ psi, and the outer layer 16 is to consist of polyurethane which has a Young's modulus of about 500 psi. The radius $R_f$ of the optical waveguide fiber is 2.5 mils, and the outer radius $R_o$ of the buffered fiber is to be 14 mils. By substituting these values into equation (5) it can be determined that the radius $R_i$ of the first layer 14 of plastic material should be about 11.2 mils in order to provide a buffered fiber having a minimal amount of microbending loss.

For the specific example set forth hereinabove the loss reduction factor $(H/D)^2$ is plotted in FIG. 2 as a function of the radius $R_i$ of the inner layer of plastic material. At a radius $R_i$ of about 11.2 mils the microbending loss is decreased by a factor of 19 over the value that would be obtained with polyurethane alone.

The effectiveness of the double layer coating of the present invention is reduced if the specified outer radius $R_o$ is too small. In such a situation, the soft outer layer will be so thin that it may become deformed beyond its elastic limit. In the example described hereinabove the thickness of the outer layer is about 25% of the outer radius $R_o$. If, in accordance with the aforementioned Gloge publication, it is estimated that the elastic limit of the soft coating may be exceeded if its thickness is less than about 1 mil, then it can be seen that the effectiveness of the optimal combination will be reduced if the outer radius $R_o$ is less than about 4 mils. Thus, the present invention applies only to those coated fibers having an outer radius $R_o$ greater than 4 mils.

Figure 2:
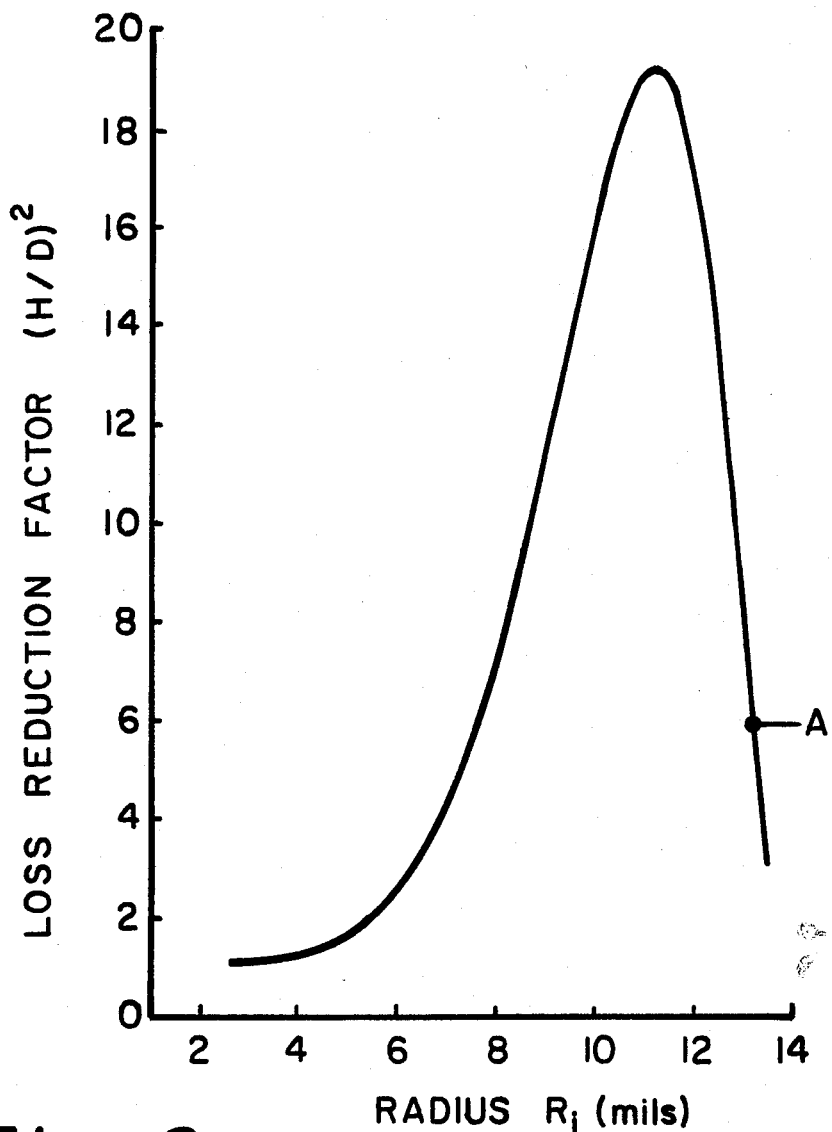
FIG. 2 is a graph wherein the loss reduction factor of a two layer coating is plotted as a function of the radius $R_i$ of the inner layer for a specific example.

Since the Gloge publication specifies that the thickness of the soft outer coating is 0.02 mm or about 0.8 mil, the loss reduction factor of a buffered fiber constructed in accordance with that publication would be about 5.8 as indicated by point A of FIG. 2, provided that the outer radius $R_o$ is 14 mils as specified in the specific example described hereinabove. The radius $R_i$ indicated by point A is more than 15% greater than the optimal value of 11.2 mils. Thus, a coated fiber is within the scope of the present invention if the radius $R_i$ thereof is substantially the value determined by equation (5), i.e., if $R_i$ is within 15% of the value determined by that equation.

Although the present invention has been described with respect to specific details of a certain embodiment thereof, it is not intended that such details be limitations upon the scope of the invention except insofar as set forth in the following claims.

I claim:

1. A buffered optical waveguide fiber comprising
    an optical waveguide fiber formed of a material having a Young's modulus $E_f$ and having a radius $R_f$,
    a first layer of a first plastic material having a Young's modulus $E_i$ disposed on the external surface of said fiber, $E_f$ being at least 10 times greater than $E_i$, and
    a second layer of a second plastic material having a Young's modulus $E_o$ disposed on the surface of said first layer, $E_i$ being at least 10 times greater than $E_o$, the ratio of the outer radius $R_i$ of the first layer to the outer radius $R_o$ of the second layer being substantially the value determined by the equation $$R_i/R_o \simeq 0.817 - K/18 - 27/32(E_f R_f^4/E_i R_o^4)$$

where $K$ is given by the equation $K = (1-2\nu)$ and $\nu$ is the average Poisson's ratio for the first and second plastic materials, $R_o$ is greater than 4 mils, the thickness of the second layer is at least 1 mil, and the ratio $(E_f R_f^4/E_i R_i^4)$ is less than 0.1.

2. A buffered optical waveguide fiber in accordance with claim 1 wherein said fiber consists of glass.

3. A buffered optical waveguide fiber in accordance with claim 2 wherein said first layer is a material selected from the group consisting of flurocarbon, nylon, thermoplastic polyethylene and polycarbonate and said second layer is a material selected from the group consisting of polyurethane elastomer, ethylene vinyl acetate, polyvinyl chloride and thermoplastic rubber.

4. A buffered optical waveguide fiber in accordance with claim 3 wherein said fiber consists primarily of silica.

* * * * *